May 18, 1965

J. H. BREWER 3,184,395

APPARATUS AND METHOD FOR CULTURING
AEROBIC MICROORGANISMS

Filed Oct. 1, 1962

INVENTOR.
JOHN H. BREWER

BY

Kane, Dalsimer and Kane
ATTORNEYS

United States Patent Office 3,184,395
Patented May 18, 1965

3,184,395
APPARATUS AND METHOD FOR CULTURING AEROBIC MICROORGANISMS
John H. Brewer, 425 Oak Lane, Towson 4, Md.
Filed Oct. 1, 1962, Ser. No. 227,231
6 Claims. (Cl. 195—80)

This invention relates to an improved apparatus and method for culturing aerobic microorganisms such as aerobic bacteria, yeasts and molds.

Heretofore the culturing of aerobic microorganisms has presented a number of difficulties and disadvantages. Thus, the apparatus and equipment required in the culturing of aerobic microorganisms has been expensive and bulky, requiring a considerable amount of space, and has been difficult to handle requiring the attention of skilled technicians. Most continuous culture techniques used in the cultivation of microorganisms for the purpose of vaccine or other uses, such as toxoid production, require the use of large flasks or tanks in which there is agitation by some mechanical means in order to properly oxygenate the culture media. Other types employ the bubbling of sterile air through such devices. It will be readily appreciated that, as pointed out above, apparatus of this type is expensive and cumbersome and requires the services of skilled technicians.

It is an object of the present invention to overcome the difficulties and disadvantages heretofore encountered and to provide an improved apparatus and method for the culturing of aerobic microorganisms such as aerobic bacteria, yeasts and molds utilizing equipment which is relatively small and compact requiring a minimum amount of space; which is relatively inexpensive and therefore can be disposable; which does not require the continuous attention of skilled technicians; and which minimizes the danger of contamination.

In carrying out my invention I contemplate providing an envelope forming a container for liquid culture media which is impervious to the liquid culture media and has at least a portion thereof which is pervious to air. In a preferred form of my invention the envelope is made of a plastic material so that it is flexible, compact and relatively inexpensive. In the culturing of aerobic bacteria in pellicle form one of the layers forming the envelope should be pervious to air and the other layer impervious, with the result that the aerobic microorganisms will grow and multiply in pellicle form on the inner surface of the air pervious layer. Both layers of the envelope may be pervious to air for the deep culturing of aerobic microorganisms. It is also within the contemplation of my invention that the interior of the envelope be formed into an elongated tortuous chamber and that an inlet and an outlet for culture media should be provided adjacent opposite ends thereof, whereby while the micro-organisms are growing and multiplying culture media may be slowly introduced adjacent one end of the chamber and slowly withdrawn at a corresponding rate from the other end of the chamber. This technique is useful in toxoid production since the culture media withdrawn from the chamber contains the toxins produced by the microorganisms.

In the accompanying drawings FIG. 1 is an elevation view of one form of apparatus embodying my invention;

In the several forms of my invention I provide an envelope or casing which is inert and impervious to the culture media and the microorganisms to be cultured and either the entire casing or one portion thereof (as, for instance, one side of the envelope) is pervious to air, specifically to oxygen.

The envelope or casing in the several forms of my invention are preferably made of a relatively thin flexible plastic material inert to and impermeable to the culture media and the microorganisms to be cultured. In the form of envelope or casing shown in FIGS. 1 and 2 the entire envelope is pervious or permeable to oxygen or air. A thin sheet in the order of .002" thick of polyethylene or polypropylene, will transmit oxygen and air and serve very satisfactorily as the envelope or casing material.

From the standpoint of ease and simplicity of manufacture I prefer to employ a thermoplastic material so that the heat sealing can be employed for sealing the casing and forming the interior partitions thereof and all of the above indicated materials are thermoplastic in character. For certain purposes it is preferred that the plastic material be transparent so that the bacteriologist or technician can observe the media and culture inside the casing and all of the above indicated plastic materials are available in transparent form.

Figure 1:
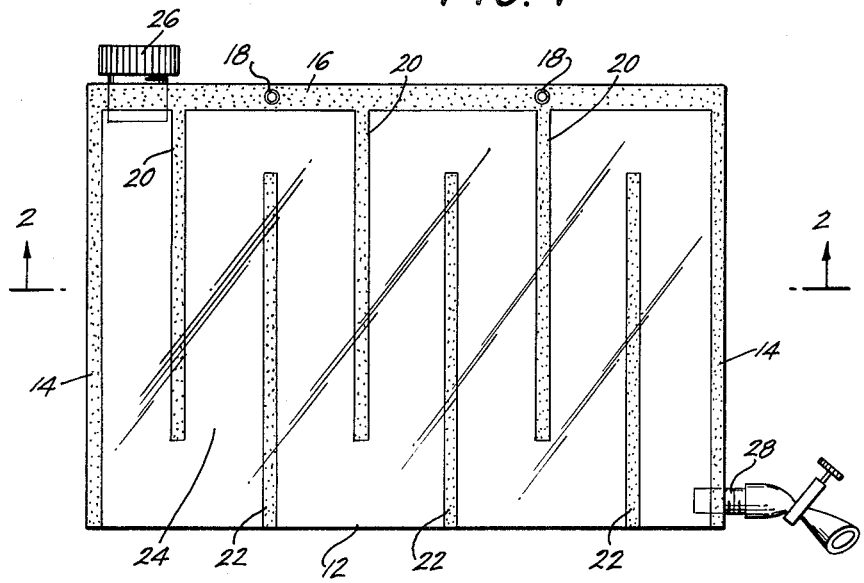
Figure 2:
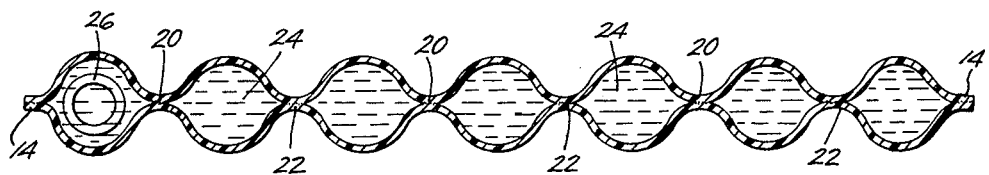
FIG. 2 is a cross-sectional view in the direction of the arrows on the line 2—2 of FIG. 1.

In making the envelope illustrated in FIGS. 1 and 2 a sheet of air permeable plastic material of the type indicated above inert to and impervious to the liquid culture media is folded upon itself along its lower edge 12 and then heat sealed along the lateral edges at 14 and across the top at 16 so as to provide a completely sealed envelope. The top of the envelope, as shown, may be provided with apertures 18, preferably fitted with grommets for supporting or suspending the envelope in vertical or upright position.

The interior of the envelope is preferably formed into a relatively elongated tortuous chamber or passage, as shown, by providing a plurality of heat sealed partitions 20 and 22 connected between the two layers of the envelope and extending respectively from the top and bottom edges of the envelope to points spaced from the opposite edge. In this way a continuous culture media chamber or passage 24 extending in tortuous fashion from one end to the other of the envelope is provided inside the envelope. Inlet and outlet apertures fitted with shutoff valves or removable threaded stoppers are provided in the envelope adjacent opposite ends of the passageway as shown at 26 and 28.

Inside the elongated chamber or passageway in the envelope, I place the culture media. Any of the well-known culture media may be employed, such as dilute solutions of peptones or dextrose, sucrose, glucose, maltose, and other sugars, gelatin, serum, blood and the like. When the culture media has been placed in the envelope the inlet and outlet apertures are closed. The envelope is sterilized either before or after the culture media is placed therein. If it is sterilized before the culture media is placed therein, then sterile culture media is aseptically introduced in the envelope. In the case of plastic envelopes which will withstand high temperatures, such as envelopes made of polypropylene, the sterilizing may be accomplished by autoclaving at 15 lbs. steam pressure at 121° C. for twenty minutes. All of the plastic materials may be sterilized by radiation or by immersing the envelope in an atmosphere of ethylene oxide.

The microorganisms to be cultured may be inserted in the culture media inside the envelope through one of the inlet or outlet ports 26 or 28 or the inoculation may be accomplished by inserting a hypodermic needle through the envelope and injecting a small quantity of the microorganisms to be cultured. Upon withdrawal of the needle the envelope or casing may be resealed with a sterile strip of pressure sensitive tape. The envelope shown in FIGS. 1 and 2 is particularly suitable for the deep culturing of aerobic microorganisms, such as *Staphylococcus aureus, corynebacterium diphtheriae, Bacillus anthracis, Bacillus cereus, Listeria monocytogenes, Vibrio cholerae, Actinomyces asteroides, Actinomyces madurae, Actinomyces fumigatus, Aspergillus, nidulans, Aspergillus flavus, Aspergillus niger Microsporum lanosum, Salmonella typhosa, Pastuerella tularensis Proteus OX-19, Shigella dysenteriae, Candida lipolytica,* and *Cladosporum resinae.*

After inoculation of the culture media the assembly is then maintained in the desired thermal environment and with the air pervious envelope exposed to the air or oxygen so that the air can enter therethrough. In this connection, the envelope may be suspended from the apertures 18 in an incubator or similar apparatus. For most microorganisms the temperature range will be between 20° and 45° C. In the case of psychrophiles the preferred temperature is between 0° and 20° C. In the case of mesophiles the preferred temperature is between 20° and 45° C., and in the case of thermophiles the preferred temperature is between 45° and 70° C. While thus maintained in the desired thermal environment and with the envelope exposed to the air or oxygen the aerobic microorganisms will grow and multiply. The apparatus shown in FIGS. 1 and 2 is useful primarily in the batch production of aerobic microorganisms or toxins. When a maximum microorganism growth has been obtained the culture media may be withdrawn from the envelope through the outlet 28 and the microorganisms or toxin can be separated therefrom following standard procedures.

Figure 3:
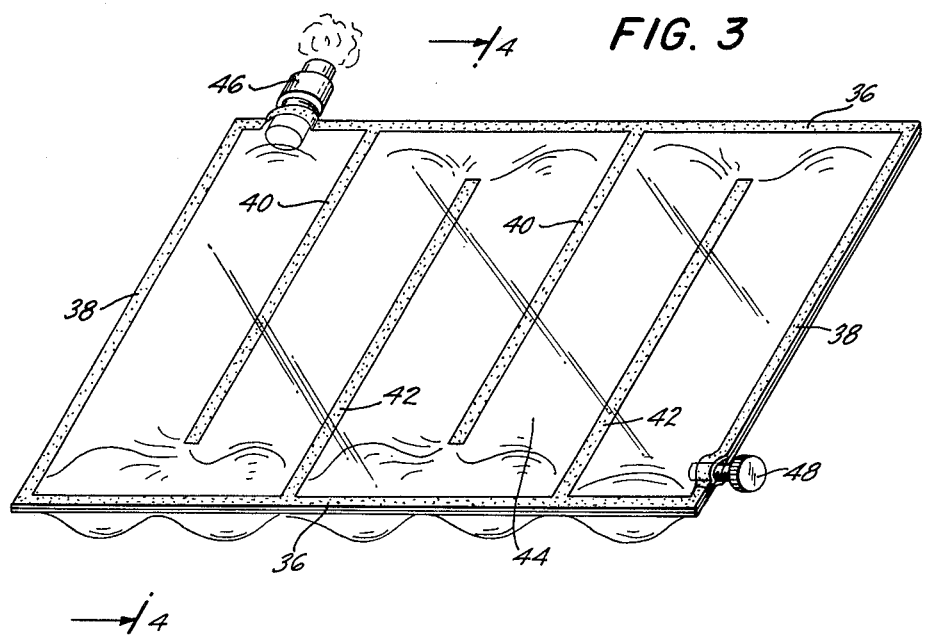
FIG. 3 is a perspective view of a modified form of my invention.
Figure 4:
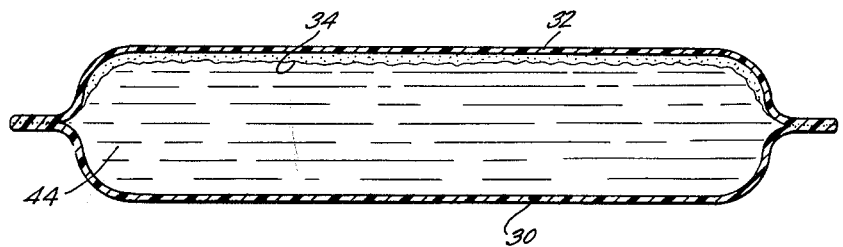
FIG. 4 is a sectional view in the direction of the arrows on the line 4—4 of FIG. 3.

The preferred form of my apparatus is shown in FIGS. 3 and 4 in which the envelope is made of two layers of plastic material 30 and 32, both impermeable and inert to the culture media and with layer 30 being impermeable to air and oxygen and layer 32 being permeable to air and oxygen. This form of envelope is useful in the pellicle growth of aerobic microorganisms on the inner surface of layer 32, as indicated at 34. The air permeable layer 32 of the envelope may consist of a thin sheet of any flexible plastic material which is permeable to air and oxygen and which is inert to and impermeable to the culture media and microorganisms, such as a thin sheet in the order of .002" thick of polyethylene or polypropylene.

Layer 30, which is impermeable to air and oxygen, may be made of the same material, but in relatively thicker sheets in the order of .006" or more in thickness. I have also found that thinner layers of this same material laminated together provide an air and oxygen impervious sheet. The two layers 30 and 32 are heat sealed adjacent their upper and lower edges at 36 and adjacent their side edges at 38 to form a completely sealed envelope. The envelope is also preferably provided with heat sealed partitions 40 and 42 arranged in alternate relationship and extending downwardly from the upper end of the envelope and upwardly from the lower end of the envelope to a spaced distance from the opposite side of the envelope providing a relatively elongated tortuous passage 44 extending from one end of the other of the envelope.

Inlet and outlet openings 46 and 48 are formed in the envelope adjacent the opposite ends of the passage or chamber 44 and are provided with removable threaded closures, as shown, or with control valves. The culture media may be introduced and withdrawn through the inlet and outlet. The envelope is sterilized in the manner previously indicated either prior to or after the introduction of the culture media. If it is sterilized before the culture media is placed therein then sterile culture media is aseptically introduced into the envelope.

The microorganisms to be cultured may be inserted in the culture media inside the envelope through the inlet or outlet openings 46 or 48, or the inoculation may be accomplished by inserting a hypodermic needle through the envelope and injecting a small quantity of the microorganism inside the envelope adjacent the air previous layer 32. Upon withdrawal of the needle the envelope may be resealed with a sterile strip of pressure sensitive tape. Aerobic microorganisms of the type previously indicated are used in inoculating the culture media. After inoculation the assembly is placed in a suitable thermal environment as previously indicated with air pervious layer 32 exposed to oxygen or the air. The aerobic pellicle forming microorganisms grow and multiply in pellicle form on the inner surface of the air pervious layer 32, as indicated at 34. When the growth is initiated additional culture media is introuced through one of the openings 46 or 48, and the material from inside the envelope is harvested by slowly withdrawing the culture media from the opposite opening at the same rate as the new culture media is introduced through the first opening. The toxin in the culture media which is withdrawn from the envelope can be used in toxoid production. If it is desired to recover the microorganisms themselves which have grown in pellicle form the above procedure is followed until a heavy pellicle growth is obtained on the inner surface of the air permeable layer. All of the culture media is drained out and the bag is filled with saline. Then, by employing a massaging action on the envelope the organisms can be evenly distributed in the saline and drained out.

Specific examples of the culturing of microorganisms pursuant to my invention are as follows:

*Example 1.*—A tortuous envelope or casing of the type shown in FIGS. 3 and 4 is provided in which the envelope has one air pervious layer and one layer impervious to air. This form of envelope is used in the pellicle growth of aerobic microorganisms. The envelope may be made of polypropylene with the air permeable layer being .002" in thickness. Each layer is approximately 14½" long and 7½" wide, and the two layers are heat sealed around their edges with a culture media inlet provided at one end and the culture media outlet provided at the other end.

Partitions are extended part way across the envelope in opposite alternate relationship providing an internal passageway approximately 2" in width.

The culture media containing 2% peptone, and having a pH of approximately 7.8 to 8.0, is inserted in the envelope and the assembly is sterilized.

The culture media adjacent the inner surface of the air pervious layer is then inoculated with *Corynebacterium diphtheriae* by means of a hypodermic needle. Upon withdrawal of the needle the aperture left thereby is sealed with sterile pressure sensitive tape. The envelope is then suspended in a thermal atmosphere of 36° to 37° C., with the air permeable layer exposed to the air until the pellicle growth develops on the inner surface of the air permeable layer. Maximum toxin production occurs from 7 to 10 days after inoculation, at which time new culture media is slowly added at a uniform rate at the opening at one end of the envelope and the culture media with a toxin therein is withdrawn at the same rate through the opening at the opposite end of the envelope.

I have found that a rate of flow of approximately ¼ of the original volume per day gives satisfactory production. The toxin in the culture media which has been withdrawn may be used in toxoid production.

*Example 2.*—The procedure set forth in Example 1 is repeated and the *Corynebacterium diphtheriae* microorganisms are recovered from the apparatus after a heavy pellicle growth has been obtained. This is accomplished by draining all of the culture media from the envelope and filling the envelope with saline. The envelope is then subjected to a massaging action causing an even distribution of the *Corynebacterium diphtheriae* microorganisms in the saline. The saline can then be withdrawn and the microorganisms used for inoculating other culture media or any other purpose.

*Example 3.*—An envelope of the type shown in FIGS. 1 and 2 is made from plastic material impervious to the culture media but permeable to air and oxygen. For this purpose a sheet of polyethylene approximately 0.002" in thickness is folded upon itself and heat sealed around its side and top edges so as to provide an envelope approximately 14½" long and 7½" wide. Partitions are extended inwardly from opposite sides of the envelope in alternating relationship part way across the envelope to provide an elongated tortuous passage approximately 2" in width with an inlet opening adjacent one end of the envelope and an outlet opening adjacent the other end of the envelope. This envelope is then used for the deep culturing of *Bacillus cereus* to produce the enzyme penicillinase, by inserting in the envelope a culture media consisting of the following formula:

| | Gm. |
|---|---|
| Solution 1: | |
| Peptone | 1.0 |
| Dibasic potassium phosphate | 0.25 |
| Sodium citrate | 0.6 |
| Water | 100.0 |
| Solution 2 (salt solution): | |
| Magnesium sulphate $(MgSO_4 \cdot 7H_2O)$ | 4.1 |
| Ammonium ferrous sulfate $[(NH_4)_3Fe(SO_4)_2]$ | 0.016 |
| Water | 100.0 |

Both solutions are sterilized and cooled and 1.0 ml. of Solution 2 is added aseptically to Solution 1. Thereafter the assembly is sterilized and the media is inoculated with *Bacillus cereus* by aseptically inserting the microorganisms through one of the openings. The assembly is then placed in a suitable thermal environment of approximately between 30° to 37° C. with the air pervious envelope exposed to the air until a maximum growth of the microorganisms has been obtained. The culture media with the enzyme penicillinase and microorganisms therein is then withdrawn from the envelope and the penicillinase separated from the microorganisms.

It will be appreciated that modifications may be made in the illustrative embodiments and examples of my invention within the scope of the appended claims. Thus, the specific size, shape and configuration of the envelopes may be changed, the envelopes may be made of any suitable materials having the indicated characteristics, any suitable culture media may be employed, and the apparatus may be used for the culturing of any aerobic microorganisms.

I claim:

1. Apparatus for use in the culturing of aerobic microorganisms comprising an envelope made of two layers of relatively thin flexible thermoplastic material having sealing connection adjacent the edges thereof and having a plurality of heat seal partitions extending inwardly from opposite sides of the envelope in alternate relationship and extending only part way across the envelope so as to divide the interior of the envelope into a relatively elongated tortuous culture media chamber, both of said layers being impervious to the culture media and at least one of said layers being pervious to air and an inlet and an outlet for said culture media communicating with the said tortuous chamber adjacent respectively opposite ends thereof.

2. The method of culturing aerobic microorganisms comprising encasing culture media in an envelope providing an elongated tortuous chamber with both sides thereof being impervious to the culture media and with at least one side thereof being pervious to air, then after the media has been inoculated with aerobic microorganisms maintaining the assembly in a suitable thermal environment with the air pervious portion exposed to air to cause the microorganisms to grow and multiply and, when the microorganisms are growing and multiplying, slowly introducing culture media adjacent one end of the elongated tortuous chamber and withdrawing culture media at substantially the same rate adjacent the opposite end thereof.

3. The method of culturing aerobic microorganisms which comprises first providing an envelope having liquid culture media therein and made of two layers of thin flexible plastic material having sealing connection adjacent the edges with the plastic material being impervious to the liquid culture media and with at least one layer being pervious to air, then introducing aerobic microorganisms into the culture media inside the envelope, next maintaining the assembly in a suitable thermal environment with the air pervious layer exposed to air to cause the microorganisms to grow and reproduce and finally while the microorganisms are growing and reproducing slowly introducing further culture media into said envelope at one point and simultaneously slowly withdrawing culture media at substantially the same rate at another point remote from the first mentioned point.

4. The method of culturing aerobic microorganisms in pellicle form which comprises first providing an envelope having liquid culture media therein and formed of two layers of plastic material impervious to the liquid culture media and having sealing connection adjacent the edges thereof with one layer being impervious to air and the other layer being pervious to air, introducing aerobic microorganisms into the culture media inside the envelope adjacent the layer which is pervious to air, maintaining the assembly in a suitable thermal environment with the air pervious layer exposed to air to cause the microorganisms to grow and reproduce in pellicle form on the inner surface of the air permeable layer and then while the microorganisms are growing and mutiplying, slowly introducing culture media inside said envelope at one point and slowly withdrawing culture media from inside said envelope at substantially the same rate at a point remote from the point of introduction.

5. The method of culturing aerobic bacteria for toxoid production which comprises first providing an envelope with an elongated tortuous chamber having liquid culture media therein and made of a thin flexible plastic material impervious to the liquid culture media and with at least a portion of the envelope being pervious to air, then introducing aerobic microorganisms into the culture media inside the envelope, next maintaining the assembly in a suitable thermal environment with the air pervious portion exposed to air to cause the microorganisms to grow and reproduce and finally while the microorganisms are growing and reproducing, slowly introducing culture media into the envelope adjacent one end of said torturous chamber and simultaneously slowly withdrawing from the envelope adjacent the opposite end of said chamber a corresponding quantity of culture media having toxins therein.

6. The method of culturing aerobic microorganisms which comprises first providing an envelope having liquid culture media therein and made of two layers of thin flexible plastic material having sealing connection adjacent the edges with the plastic material being impervious to the liquid culture media and one layer being pervious to air, then introducing aerobic microorganisms into the culture media inside the envelope, next maintaining the assembly in a suitable thermal environment with the air pervious layer exposed to air to cause the microorganisms to grow and reproduce in pellicle growth adjacent the air pervious layer and finally drawing off the culture media at the distal end of the envelope and adding saline solution at the proximal end, massaging the pellicle growth adjacent the air pervious layer dispersing aerobic microorganisms in the saline solution and recovering aerobic microorganisms from the flexible plastic envelope.

References Cited by the Examiner

UNITED STATES PATENTS

| | | | |
|---|---|---|---|
| 2,606,120 | 8/52 | Cherepow | 99—178 |
| 2,851,821 | 9/58 | Guiochon | 195—54 |
| 2,961,322 | 11/60 | Winterberg | 99—178 |
| 3,039,938 | 6/62 | Charm | 195—139 |

OTHER REFERENCES

Modern Packaging, May 1954, pp. 155 to 158.

A. LOUIS MONACELL, *Primary Examiner*.

ABRAHAM H. WINKELSTEIN, *Examiner*.